US005658860A

United States Patent [19]
Clark et al.

[11] Patent Number: 5,658,860
[45] Date of Patent: Aug. 19, 1997

[54] ENVIRONMENTALLY SAFE LUBRICATED WELL FLUID METHOD OF MAKING A WELL FLUID AND METHOD OF DRILLING

[75] Inventors: David E. Clark, Humble; William M. Dye, Houston, both of Tex.

[73] Assignee: Baker Hughes Incorporated, Houston, Tex.

[21] Appl. No.: 482,712

[22] Filed: Jun. 7, 1995

[51] Int. Cl.$^6$ .................................... C09K 7/02
[52] U.S. Cl. ................ 507/134; 507/135; 507/252; 507/256
[58] Field of Search .................. 507/134, 135, 507/252, 256

[56] References Cited

U.S. PATENT DOCUMENTS

| | | | |
|---|---|---|---|
| 3,027,324 | 3/1962 | Rosenberg | 507/134 |
| 3,111,998 | 11/1963 | Crowley | 507/134 |
| 3,396,105 | 8/1968 | Burdyn et al. | 507/134 |
| 3,425,940 | 2/1969 | Norton | 507/252 |
| 4,053,422 | 10/1977 | Walker | 507/134 |
| 4,141,840 | 2/1979 | Walker et al. | 507/134 |
| 4,218,331 | 8/1980 | Bacha et al. | 507/252 |
| 4,266,610 | 5/1981 | Meister | 507/134 |
| 4,341,645 | 7/1982 | Blattel et al. | 507/134 |
| 4,517,100 | 5/1985 | Nance et al. | 507/252 |
| 4,631,136 | 12/1986 | Jones, III | 252/8.5 M |
| 4,819,729 | 4/1989 | Bae et al. | 507/252 |
| 5,007,489 | 4/1991 | Enright et al. | 175/65 |
| 5,099,930 | 3/1992 | Enright et al. | 175/65 |

FOREIGN PATENT DOCUMENTS

| | | | |
|---|---|---|---|
| 0 453 625 A2 | 3/1990 | European Pat. Off. | C09K 7/02 |
| 0 453 625 A3 | 3/1990 | European Pat. Off. | C09K 7/02 |
| 2 087 952 | 9/1981 | United Kingdom . | |

*Primary Examiner*—Philip Tucker
*Attorney, Agent, or Firm*—J. M. (Mark) Gilbreth; Robert W. Strozier; Gilbreth & Strozier, P.C.

[57] ABSTRACT

A well fluid emusion having a water phase and an oil phase of a sulfurized alcohol and a naturally occuring fat, oil or derivatives thereof. Also disclosed is a method of lubricating drilling equipment used in conjunction with the drilling, completion or workover of a subterranean well. The method includes introducing the above emulsified well fluid into the well for circulation through and out of the well, and further includes contacting the surface of the drilling equipment with the emulsified well fluid to provide an interface between the equipment surface and the water phase. Suitable naturally occurring fats and oils may be obtained from the following animal oils and fats: butter, lard, tallow, grease, herring, menhaden, pilchard and sardine; and from the following vegetable oils and fats: castor, coconut, coffee, corn, cottonseed, jojoba, linseed, liticica, olive, palm, palm kernel, peanut, rapeseed, safflower, soya, sunflower, tall and tung.

27 Claims, No Drawings

ENVIRONMENTALLY SAFE LUBRICATED WELL FLUID METHOD OF MAKING A WELL FLUID AND METHOD OF DRILLING

BACKGROUND OF THE INVENTION

1. Field of the Invention

The present invention relates to a well fluid additive, to a method of making a well fluid additive, to a well fluid, to a method of making a well fluid, to a method of treating well equipment, and to a method of drilling. In another aspect, the present invention relates to a well fluid additive comprising a sulfurized alcohol solubilized in an alcohol, to a well fluid comprising a sulfurized alcohol solubilized in an alcohol, to a method of making a well fluid comprising a sulfurized alcohol solubilized in an alcohol, to a method of treating well equipment utilizing a treating fluid comprising a sulfurized alcohol solubilized in an alcohol, and to a method of drilling utilizing a drilling fluid comprising a sulfurized alcohol solubilized in an alcohol.

2. Description of the Related Art

In the drilling of wells to recover hydrocarbons such as oil and/or gas from subterranean deposits, it is common practice to use a rotary drilling procedure in which a drill bit is rotated at the bottom of the borehole by means of rotating hollow drill pipe which extends to the surface. The drill pipe is driven from the surface and a circulating fluid commonly referred to as a drilling fluid or drilling mud is pumped through the drill pipe where it emerges through openings in the drill bit to cool the same and is returned to the surface in the annular space between the drill pipe and the walls of the borehole.

The drilling fluid, upon emerging from the well at the surface, may be mechanically processed to remove the cuttings and other undesirable contaminants and is normally treated chemically to maintain certain chemical and physical properties of the fluid depending upon particular drilling conditions encountered. The drilling fluid after being reconstituted is normally recirculated by pumps to be forced downwardly through the drill pipe, this circulation being generally continuous during drilling. Circulation of the drilling fluid may be interrupted occassionally such as when an additional section of drill pipe is added at the top of the string of pipe or when the entire length of drill pipe is withdrawn to replace or repair the drill bit.

The drilling fluid must be capable of performing many varied functions which are required in a successful drilling procedure and therefore must possess certain desirable chemical and physical properties. The drilling fluid must have sufficient viscosity to suspend and remove the cuttings from the borehole and must have sufficient gel strength to hold solids in suspension, especially when circulation is interrupted. It also must have sufficient density to exert suitable pressure to the sides of the borehole to prevent the entrance of fluids into the borehole from the earth formation being penetrated, and it must have low fluid loss to prevent undue loss of fluid into the formation by its deposition on the borehole sides as by forming an impervious filter cake or deposit. Further, it must lubricate both the bearing and cutting surfaces of the drill bit as well as the string of drill pipe both upon rotations and vertical movement. Frequently, in the drilling of wells and especially in directional drilling, the friction between the string of drill pipe and the sides of the borehole may be sufficient to interfere with vertical movement of the pipe into and out of the hole. Such high friction between the drill pipe and the bore hole increases power required to rotate the drill pipe and the increased torque causes wear and stress on the pipe thus decreasing the drilling rate and causing the possibility of pipe twist-off or breakage.

The lubrication characteristics of drilling fluids have been the subject of many investigations. Prior art patents disclose many types of additives for use in petroleum oil based drilling fluids, water-in-oil emulsion drilling fluids, and water base drilling fluids. Also it has been proposed to incorporate an emulsifier in water base drilling fluids where the lubricating additive is insoluble in water. Many of the prior art additivies function as extreme pressure lubricants and are added to the drilling fluid primarily to lubricate the bearings of the drill bit. Some of the known prior art additives also serve to impart sufficient lubricity to the drilling fluid to decrease the friction occurring between the drill string and the sides of the borehole thus increasing the lubricity of the drilling fluid.

Many of the in oil type drilling fluids having lubricating characteristrics have been based upon mineral oils or diesel oil with the addition of additives therein to effect an emulsion. Pollution and toxic features of such materials are becoming increasingly objectional which limit their effectiveness.

For example, as in known in current practice, drilling muds based on diesel fuel oil and the like have been the primary medium for providing lubricants to the drill pipe in drilling for hydrocarbons. One major disadvantage in using such materials has been in drilling offshore and in lakes or wetlands, their polluting characteristics having caused severe logistics problems. Such diesel fuel based fluids cannot be disposed of into the ocean, lakes or wetlands because of their adverse effect on aquatic life. In such cases the diesel fuel containing fluids must be transported ashore to a suitable type of disposal or recovery system. Increasingly stringent regulation of the adverse environmental effects of diesel oil in drilling fluids requires the development of non-polluting replacements.

U.S. Pat. No. 3,761,410 discloses water based drilling fluids with increased lubricity, the water being dispersed as discreet small non-emulsified droplets in the fluid. This composition includes water insoluble alkyl alcohol, a lubricating additive consisting of vegetable oil or tall oil and a pour point depressant consisting of an alcohol or glycol.

U.S. Pat. No. 4,374,737 discloses a drilling mud composition for mixing with water which comprises major amounts of diethanolamine, tall oil fatty acid and imidazoline/amide mixture with a biodegradable non-polluting vegetable oil comprising a minor amount of the composition, the later to act as an emulsifier when the composition is added to water.

U.S. Pat. No. 4,631,136 relates to non-polluting non-toxic lubricating drilling fluid compositions which are emulsified and based upon plant or vegetable oils having extended carboxylic acids with 12 to 14 carbon chains.

While these prior art drilling fluids offer some advancement to the art, there is still a need in the art for improved well fluids, methods of treating a well fluid, and method of treating a well.

These and other needs in the art will become apparent to those of skill in the art upon review of this patent specification, including its drawings and claims.

SUMMARY OF THE INVENTION

It is one object of the present invention to provide for improved well fluids, methods of treating a well fluid, and method of treating a well.

These an other objects of the present invention will become apparent to those of skill in the art upon review of this patent specification, including its drawings and claims.

According to the present invention, the inventors have surprisingly discovered that an otherwise toxic sulfurized alcohol can be rendered non-toxic by solubilizing such sulfurized alcohol in an alcohol.

According to one embodiment of the present invention there is provided a method of lubricating drilling equipment used in conjunction with the drilling, completion or work-over of a subterranean well. The method generally includes introducing an emulsified well fluid into the well for circulation through and out of the well, wherein the well fluid comprises a water phase, and an oil phase comprising a sulfurized alcohol and an alcohol. The method also includes contacting the surface of the drilling equipment with the emulsified system to provide an interface between the equipment surface and the water phase.

According to another embodiment of the present invention there is provided a well fluid comprising an emusion having a water phase and an oil phase comprising a sulfurized alcohol solubilized in an alcohol.

According to even another embodiment of the present invention there is provided a method of making a well fluid comprising forming an emulsion having a water phase, and an oil or hydrophobic phase comprising a sulfurized alcohol solubilized in an alcohol.

DETAILED DESCRIPTION OF THE INVENTION

The sulfurized alcohol well fluid additive of the present invention comprises sulfurized alcohol solubilized into an alcohol. The oil-in-water emulsion well fluid of the present invention includes the sulfurized well additive, and may also include naturally occuring fats or oils or derivatives thereof.

The sulfurized alcohols used herein may generally be obtained by reacting sulfur with an unsaturated alcohol.

The sulfurized alcohol utilized in the present invention is generally selected from among alcohols and derivatives thereof that have been sulfurized. Such suitable alcohols include mono-, di-, tri- and poly-hydric alcohols which have been sulfurized. Non-limiting examples of classes of alcohols suitable for use in the present invention include glycols, glycerols, sorbitols, and derivatives thereof. The preferred class of alcohols suitable for use in the present invention are glycols, most preferably a glycol having a molecular weight in the range of about 200 to about 2000, most preferably in the range of about 500 to about 1000.

The sulfurized alcohol of the present invention may be a di-hydroxy alcohols, such as polyalkylene glycols, particularly polypropylene glycol. The sulfurized alcohol component may also be a propoxylated tri-hydroxy alcohol such as polyalkylene glycerols, particularly polypropylene glycerol. Ethylene oxide propylene oxide copolymers of di-hydroxy and tri-hydroxy alcohols may also be utilized as the sulfurized alcohol additive utilized in the present invention.

The sulfurized alcohol additive will generally comprise an alcohol and a sulfurized alcohol solubilized by the alcohol. The amount of sulfurized alcohol in the additive is generally at a concentration less than the saturation point of the sulfurized alcohol in the alcohol.

The alcohol into which the sulfurized alcohol is solubilized can be any alcohol provided that it will solubilize the sufurized alcohol.

For example, the alcohol in to which the sulfurized alcohol is generally selected from among water-soluble or poorly water insoluble alcohols and derivatives thereof. Such water-soluble or poorly water insoluble alcohols include mono-, di-, tri- and poly-hydric alcohols. Non-limiting examples of classes of alcohols suitable for use in the present invention include glycols, glycerols, sorbitols, and derivatives thereof. Silicone containing alcohols, such as silicone containing glycols are also useful in the present invention.

Polyglycols suitable for use as the solvent for the sulfurized alcohol generally have a molecular weight that will render the polyglycol sufficiently water soluble or poorly water insoluble and of proper viscosity so as not to inhibit preparation and handling. Generally for most polypropyleneglycols, this means a molecular weight in the range of about 100 to about 1200. Accordingly, it is believed that for most polyglycols, a molecular weight above about 1200 will have a tendency to be water insoluble or at least not sufficiently water soluble for use in the present invention. Of course, in those instances where a certain polyglycol may have a molecular weight outside of the above range and still be suitable, it may certainly be utilized.

This alcohol component of the present invention may be a di-hydroxy alcohols, such as polyalkylene glycols, particularly polypropylene glycol. The alcohol component may also be a propoxylated tri-hydroxy alcohol such as polyalkylene glycerols, particularly polypropylene glycerol. Ethylene oxide propylene oxide copolymers of di-hydroxy and tri-hydroxy alcohols may also be utilized as the alcohol solvent of the present invention.

Preferably, the solvent alcohol utilized to solubilize the sulfurized alcohol is a glycol having a cloud point equal to or lower than the bottom hole operating temperature of the well.

In the practice of the present invention, the sulfurized alcohol additive will generally comprise in the range of about 0.1 to about 99 volume percent of the oil-in-water emulsion well fluid. Preferably, the sulfurized alcohol will comprise in the range of about 1 to about 50 volume percent of the oil-in-water emulsion well fluid. More preferably, the sulfurized alcohol will comprise in the range of about 5 to about 35 volume percent, and most preferably in the range of about 5 to about 25 volume percent of the oil-in-water emulsion well fluid.

The well fluid of the present invention is an oil-in-water emulsion well fluid, with oil or hydrophobic phase, and a water phase. The amounts of oil and water in the well fluid may be any suitable amount as is known in the art, generally ranging from about 1 to about 99 weight percent, for the oil and water phases. In such an oil-in-water system the base fluid is water. It is well known to those of skill in the art that the source for the base fluid water is generally not important. In fact, water for such a system may be fresh water, well water, sea water, brine, or combinations thereof.

The oil-phase of the oil-in-water well fluid of the present invention may include any non-water soluble material that will provide the required rate of penetration or lubrication. Common classes materials of materials utilized as rate of penetration or lubrication additives include naturally occuring fats and oils, esters, olefin isomers, poly alpha olefins, vegetable and mineral oils, diesel oils, parafin and napthenic oils.

Where environmental concerns exist, it is preferred in the practice of the present invention that naturally occuring fats, oils, hydrocarbons, and derivatives thereof be utilized as the oil phase component of the oil-in-water emulsion well fluid. Preferably, the naturally occuring fats, oils, hydrocarbons, and derivatives thereof be utilized as the oil phase component of the oil-in-water emulsion well fluid are selected to be non-toxic and/or biodegradable.

As naturally occuring oils and fats having double and triple carbons bonds exhibit a tendency to oxidize in use or upon heating which leads to polymerization or other negative effects, a suitable amount of an antioxidant may be utilized. The antioxidant must be compatible with the well fluid, and is generally selected from among p-phenylenediamines, secondary arlyamines, alkylarylamines, ketone amines, dihydroquinolines, alkylated phenols, phosphite esters, and alkylated phenol sulfides.

Naturally occurring fats and oils suitable for use as the oil phase component of the oil-in-water well fluid of the present invention includes the following animal oils and fats: butter, lard, tallow, grease, herring, menhaden, pilchard and sardine; and including the following vegetable oils and fats: castor, coconut, coffee, corn, cottonseed, jojoba, linseed, liticica, olive, palm, palm kernel, peanut, rapeseed, safflower, soya, sunflower, tall and tung. Preferred naturally occurring oils and fats include rapeseed, castor, coffee, cotton seed, palm kernel, sunflower and lard. Most preferred naturally occurring oils and fats include rapeseed, castor and lard. The preferred rapeseed oil utilized in the present invention is a high erucic acid rapeseed oil.

Suitable fatty acids and derivatives thereof for use in the practice of the present invention include those having a carbon chain length of 8 or more. The carbon length is generally selected to provide proper compatibility with the other components of the well fluid. The carbon length is also generally selected to provide a desired reduction in the balling of formation cuttings upon the surface of the drilling equipment and/or to impart lubricity to the drilling equipment.

Generally, the fatty acids and derivatives thereof utilized in the present invention have a carbon chain length in the range of about 8 to about 30 carbon atoms. Preferably, the fatty acids and derivatives thereof utilized in the present invention have a carbon chain length in the range of about 14 to about 22 carbon atoms, and most preferably in the range of about 18 to about 22 carbon atoms.

Specific nonlimiting examples of fatty acids suitable for use in the present invention include octanoic, decanoic, dodecanoic, 9-dodecenoic(cis), tetradecanoic, 9-octadecenoic-12-hydroxy(cis), 9,12,15-octadecatrienoic (cis,cis,cis), 9,11,13-octadecatrienoic(cis,trans,trans), 9,11,13-octadecatrienoic-4-oxo(cis,trans,trans), octadecatetrenoic, eicosanoic, 11-eicosenoic(cis), eicosadeinoic, eicosatrienoic, 5,8,11,14-eicosatetraenoic, eicosapentaenoic, docosanoic, 13-docosenoic(cis) docosatetraenoic, 4,8,12,15,19 docosapentaenoic, docosahexaenoic, tetracosenoic, 4,8,12,15,18,21-tetracosahexaenoic.

Derivatives of the above described fatty acids may also be utilized in the present invention. Such derivatives include alkali, alkaline earth, or transition metal substituted fatty acids; oxidized fatty acids; amides of fatty acids; salts of fatty acids; esters of fatty acids; sulfated fatty acids; sulfonated fatty acids; alkoxylated fatty acids; phosphatized fatty acids; and mixtures thereof. Preferably, the fatty acid derivatives utilized in the present invention are oxidized fatty acids, esters of fatty acids, sulfated fatty acids and sulphonated fatty acids. Most preferably, the fatty acid derivatives utilized in the present invention are oxidized fatty acids and esters of fatty acids.

Derivatives of erucic acid suitable for use in the present invention include high erucic acid rapeseed oil ("HEAR"); oxidized HEAR oil; sulfated HEAR oil; sulfonated HEAR oil; alkali metal erucates, especially sodium erucate; alkaline earth erucates, especially calcium erucate; transition metal erucates, especially iron erucate; glycerol and polyglycerol esters of erucic acid (mono, di- and tri-); sorbitol and sorbitan esters of erucic acid (mono, di-, tri- and poly-); erucic acid esters and diesters from polyethylene glycols, polypropylene glycols and other polyalkylene oxides and/or esters; erucic acid esters of water-insoluble (or poorly water soluble) alcohols, especially 2-ethylhexyl alcohol; alkoxylated erucic acid, especially ethoxylated or propoxylated erucic acid; sulfurized HEAR oil; phosphatized HEAR oil; erucamide from alkanolamines such as diethanol amine; polyglycol amine and diamine erucamides; and mixtures thereof. Preferably, the erucic acid derivatives utilized in the present invention are oxidized erucic acids, esters of erucic acids, sulfated erucic acids and sulphonated erucic acids. Most preferably, the fatty acid derivatives utilized in the present invention are oxidized erucic acids and esters of erucic acids.

It is understood that in the practice of the present invention, the oil-in-water system may also include any of the additives and components known to those of skill in the art, such as antioxidants, bentonite, barite, gums, water soluble polymers, viscosity modifying agents, breakers, emulsifiers, thinners, circulation control additives and the like.

Additionally, while the present invention has been illustrated by reference to water based fluids, it is to be understood that the present invention could also be utilized with synthetic well fluids, and with oil-based fluids.

EXAMPLES

Example 1—Lubricity Data

A drilling fluid in which the composition of the present invention has been emulsified has been found to have excellent lubricity characteristics. For the purposes of determining lubricity, we have utilized in our testing the "Procedure for Determination of Lubricity Coefficient" (Tentative), a standardized testing procedure published by the American Petroleum Institute, (1980) as follows:

i. Calibration of Instrument
 (1) Prepare a calibration curve for conversion of ammeter reading to lubricity coefficient by using a Prony brake and procedure provided with the instrument.
 (2) Recalibrate if the drive motor is altered or replaced.

ii. Standardization of Test Ring and Block
 (1) Wash the test ring and block with water and a household cleanser. Rinse thoroughly with water.
 (2) Place the test ring on the tapered shoulder at the bottom of the shaft and secure with the lock nut.
 (3) Place the test block in the holder, concave side face out, and align with the test ring.
 (4) Fill the sample container with water (approximately 300 $cm^3$) and position it so that the test surfaces are covered.
 (5) Attach a rheostat in series with the instrument and turn on the drive motor. Adjust the rheostat until the tachometer on the drive shaft reads 60 rpm.
 (6) Apply 150 in-lbs load with the torque arm. Maintain speed at 60 rpm.
 (7) Observe meter reading in amperes and refer to the calibration chart for the lubricity coefficient. Run for several minutes or until the reading stabilizes. The lubricity coefficient for water should be between 0.33 and 0.36. If it is not in this range, the ring and block surfaces should be reconditioned using one of the following methods:

(a) Continue to operate the instrument at a constant load of 150 in.-lb with water in contact with the test surfaces. The ammeter reading should slowly approach the test range of 33 to 36 and then remain steady.

(b) Operate the instrument using a slurry of about 25 lb per bbl of bentonite in fresh water and a load of 150 in.-lb. Repeat step (1).

(c) Place a grinding compound on the contact surfaces and operate the instrument at a load of 150 in.-lb. Repeat Step (1).

iii. Determination of Mud Lubricity Coefficient (1) Assemble the instrument and standardize the test ring and block to give a 0.33 to 0.36 lubricity coefficient for water.

(2) Stir the mud sample ten minutes on a Multimixer prior to testing.

(3) Place the mud sample in the container and position to cover the ring and block.

(4) Start the motor and adjust the rheostat to give 60 rpm with a load of 150 in.-lb.

(5) Operate the instrument until the ammeter reading stabilizes.

(6) Use the calibration curve to convert the ammeter reading to lubricity coefficient.

EXAMPLE I

Using the procedure outlined above, several compositions in accordance with the present invention were prepared and tested for lubricity, with results presented in the following Table 1.

TABLE 1

Results of testing on Baroid Lubricity Testor

| Fluid Tested | Lubricity Coefficient |
| --- | --- |
| 1. Base Mud | 0.25 |
| 2. Mil-Lube | 0.12 |
| 3. 98% Duoprime 400/2% Lecithin | 0.30 |
| 4. 80% Duoprime 400/20% Lecithin | 0.28 |
| 5. Duoprime/Lecithin/H-50/Wax (25% each) | 0.26 |
| 6. 50/40/10% Duoprime/Actralube 7142/H-50 | 0.25 |
| 7. 45/45% Coffee Bean Oil/Aqua-Col + 10% Lubrizol Wax | 0.17 |
| 8. 68/32% Coffee Bean Oil/Aqua-Col + 10% Lubrizol Wax | 0.15 |
| 9. 36/36% Coffee Bean Oil/Aqua-Col + 28% Lubrizol Wax | 0.13 |
| 10. 50/50% Aqua-Col/DV 4183 | 0.21 |
| 11. 75/25% Aqua-Col/DV 4183 | 0.20 |
| 12. 90/10% Aqua-Col/Lubrizol Wax | 0.21 |
| 13. 80/20% Aqua-Col/Lubrizol Wax | 0.19 |

Duoprime is a high viscosity food grade paraffin.
Actralube 7142 is a high erucic acid rapeseed (HEAR) oil found in DFE-608.
Aqua-Col is a glycol having a 600 MW.
H-50 is a petroleum sulfonate contained in Mil-Lube, Bio-Drill and DFE-608.
DV 4183 is a water soluble surfactant.
Lubrizol wax is a substituted sulfurized alcohol.
Coffee bean oil is a commercially available refined, deodorized coffee bean oil.

Example 2—Environmental Data

U.S. EPA protocol 96 hour mycid range finder tests were conducted. Minimun pass score is 35,000 ppm of suspended particles. The results are as follows:

| Test material | Range finder results |
| --- | --- |
| 3% sulfurized alcohol in generic mud No. 7 | <30,000 |
| 3% (sulfurized alcohol and aquacol, a glycol, at a 25:75 weigh % ratio) | 500,000 to 1,000,000 |
| generic mud No. 7 | >1,000,000 |

3% Sulfurized alcohol in generic mud No. 7

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled the art to which this invention pertains.

I claim:

1. A method of lubricating drilling equipment used in conjunction with the drilling, completion or workover of a subterranean well, comprising the steps of:

(a) introducing an emulsified well fluid into the well for circulation through and out of the well, wherein the well fluid comprises a water phase and a hydrophobic phase and comprises an additive of a sulfurized alcohol solubilized in a water soluble alcohol solvent; and (b) contacting the surface of the drilling equipment with the emulsified system to provide an interface on the the equipment surface.

2. The method of claim 1 wherein the hydrophobic phase further comprises a naturally occuring fat, oil or derivative thereof, wherein the derivative is an alkali, alkaline earth, or transition metal substituted fatty acid, an oxidized fatty acid, an amide of fatty acid, a salts of fatty acid, an ester of fatty acid, a sulfated fatty acids, a sulfonated fatty acids, an alkoxylated fatty acid, a phosphatized fatty acids, and mixtures thereof.

3. The method of claim 1 wherein the sulfurized alcohol is selected from among mono-, di-, tri- and poly-hydric alcohols which have been sulfurized.

4. The method of claim 1 wherein the sulfurized alcohol is selected from among glycols, glycerols, sorbitols, and derivatives thereof, wherein the derivative is an alkali, alkaline earth, or transition metal substituted fatty acid, an oxidized fatty acid, an amide of fatty acid, a salts of fatty acid, an ester of fatty acid, a sulfated fatty acids, a sulfonated fatty acids, an alkoxylated fatty acid, a phosphatized fatty acids, and mixtures thereof.

5. The method of claim 1 wherein the alcohol solvent has a cloud point temperature less than or equal to a bottom hole temperature of the well.

6. The method claim 1 wherein the well fluid comprises in the range of about 5 to about 35 volume percent additive.

7. The method claim 1 wherein the well fluid comprises in the range of about 5 to about 35 volume percent additive, wherein the hydrophobic phase further comprises a naturally occuring fat, oil or derivative thereof, wherein the alcohol solvent is a glycol having a cloud point temperature less than or equal to a bottom hole temperature of the well, and wherein the derivative is an alkali, alkaline earth, or transition metal substituted fatty acid, an oxidized fatty acid, an amide of fatty acid, a salts of fatty acid, an ester of fatty acid, a sulfated fatty acids, a sulfonated fatty acids, an alkoxylated fatty acid, a phosphatized fatty acids, and mixtures thereof.

8. A well fluid comprising an emulsion having a water phase and a hydrophobic phase and comprising an additive of sulfurized alcohol solubilized in a water soluble alcohol.

9. The well fluid of claim 8 wherein the hydrophobic phase further comprises a naturally occuring fat, oil or derivative thereof, wherein the derivative is an alkali, alkaline earth, or transition metal substituted fatty acid, an oxidized fatty acid, an amide of fatty acid, a salts of fatty acid, an ester of fatty acid, a sulfated fatty acids, a sulfonated fatty acids, an alkoxylated fatty acid, a phosphatized fatty acids, and mixtures thereof.

10. The well fluid of claim 8 wherein the sulfurized alcohol is selected from among mono-, di-, tri- and polyhydric alcohols which have been sulfurized.

11. The well fluid of claim 8 wherein the sulfurized alcohol is selected from among glycols, glycerols, sorbitols, and derivatives thereof, wherein the derivative is an alkali, alkaline earth, or transition metal substituted fatty acid, an oxidized fatty acid, an amide of fatty acid, a salts of fatty acid, an ester of fatty acid, a sulfated fatty acids, a sulfonated fatty acids, an alkoxylated fatty acid, a phosphatized fatty acids, and mixtures thereof.

12. The well fluid of claim 8 wherein the alcohol solvent is a glycol having a cloud point temperature less than or equal to a bottom hole temperature of a well into which the fluid will be circulated.

13. The well fluid of claim 8 comprising in the range of about 5 to about 35 volume percent additive.

14. The well fluid of claim 8 comprising in the range of about 5 to about 35 volume percent additive, wherein the hydrophobic phase further comprises a naturally occuring fat, oil or derivative thereof, wherein the alcohol solvent is a glycol having a cloud point temperature less than or equal to a bottom hole temperature of a well into which the fluid will be circulated, and wherein the derivative is an alkali, alkaline earth, or transition metal substituted fatty acid, an oxidized fatty acid, an amide of fatty acid, a salts of fatty acid, an ester of fatty acid, a sulfated fatty acids, a sulfonated fatty acids, an alkoxylated fatty acid, a phosphatized fatty acids, and mixtures thereof.

15. A method of making a well fluid comprising contacting a water phase, a hydrophobic phase, and an additive together to form an emulsion, wherein the additive comprises sulfurized alcohol solubilized in a water soluble alcohol solvent.

16. The method of claim 15 wherein the hydrophobic phase comprises a naturally occuring fat, oil or derivative thereof, wherein the derivative is an alkali, alkaline earth, or transition metal substituted fatty acid, an oxidized fatty acid, an amide of fatty acid, a salts of fatty acid, an ester of fatty acid, a sulfated fatty acids, a sulfonated fatty acids, an alkoxylated fatty acid, a phosphatized fatty acids, and mixtures thereof.

17. The method of claim 15 wherein the sulfurized alcohol is selected from among mono-, di-, tri- and polyhydric alcohols which have been sulfurized.

18. The method of claim 15 wherein the sulfurized alcohol is selected from among glycols, glycerols, sorbitols, and derivatives thereof, wherein the derivative is an alkali, alkaline earth, or transition metal substituted fatty acid, an oxidized fatty acid, an amide of fatty acid, a salts of fatty acid, an ester of fatty acid, a sulfated fatty acids, a sulfonated fatty acids, an alkoxylated fatty acid, a phosphatized fatty acids, and mixtures thereof.

19. The method of claim 15 wherein the alcohol solvent has a cloud point temperature less than or equal to a bottom hole temperature of a well into which the fluid will be circulated.

20. The method of claim 15 comprising in the range of about 5 to about 35 volume percent additive.

21. The method of claim 15 comprising in the range of about 5 to about 35 volume percent additive, wherein the hydrophobic phase further comprises a naturally occuring fat, oil or derivative thereof, wherein the alcohol solvent is a glycol having a cloud point temperature less than or equal to a bottom hole temperature of a well into which the fluid will be circulated, and wherein the derivative is an alkali, alkaline earth, or transition metal substituted fatty acid, an oxidized fatty acid, an amide of fatty acid, a salts of fatty acid, an ester of fatty acid, a sulfated fatty acids, a sulfonated fatty acids, an alkoxylated fatty acid, a phosphatized fatty acids, and mixtures thereof.

22. The method of claim 5 wherein the alcohol solvent is a glycol.

23. The method of claim 19 wherein the alcohol solvent is a glycol.

24. A method of lubricating drilling equipment used in conjunction with the drilling, completion or workover of a subterranean well, comprising the steps of:

(a) introducing an emulsified well fluid into the well for circulation through and out of the well, wherein the well fluid comprises a water phase and a hydrophobic phase and comprises an additive of a sulfurized alcohol solubilized in a glycol solvent; and (b) contacting the surface of the drilling equipment with the emulsified system to provide an interface on the the equipment surface;

wherein the glycol solvent has a cloud point temperature less than or equal to a bottom hole temperature of the well.

25. The method of claim 24 wherein the glycol solvent is water soluble.

26. A method of making a well fluid comprising contacting a water phase, a hydrophobic phase, and an additive together to form an emulsion, wherein the additive comprises sulfurized alcohol solubilized in a glycol solvent, and wherein the glycol solvent has a cloud point temperature less than or equal to a bottom hole temperature of a well into which the fluid will be circulated.

27. The method of claim 26 wherein the glycol solvent is water soluble.

* * * * *